United States Patent
Elpern et al.

[15] 3,673,238
[45] June 27, 1972

[54] 2-NAPHTHOIC ACID DERIVATIVES

[72] Inventors: Bill Elpern, White Plains; Harris J. Shapiro; James R. Shroff, both of Bronx; Harold Soloway, New Rochelle, all of N.Y.

[73] Assignee: USV Pharmaceutical Corporation

[22] Filed: Feb. 10, 1970

[21] Appl. No.: 10,294

[52] U.S. Cl. ............ 260/471 A, 260/247.2 B, 260/268 BC, 260/293.62, 260/326.3
[51] Int. Cl. ......................................................C07c 101/42
[58] Field of Search .................................260/471 A

[56] References Cited

UNITED STATES PATENTS 2,387,447  10/1945  Hoffmann et al. .....................260/471

Primary Examiner—Lorraine A. Weinberger
Assistant Examiner—R. S. Weissberg
Attorney—Leon E. Tenenbaum

[57] ABSTRACT

Napthoic acid derivatives of the formula

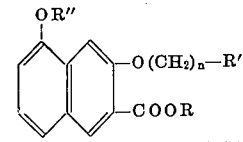

where R is lower alkyl, R' is a secondary amino group and R'' is hydrogen, phenyl-lower alkyl, or substituted phenyl-lower alkyl have hypotensive activity.

11 Claims, No Drawings

2-NAPHTHOIC ACID DERIVATIVES

This invention relates to new organic compounds having valuable pharmacological activity and to a process for the preparation of said compounds. In particular, the invention relates to derivatives of 3,5-dihydroxy-2-naphthoic acid of the formula

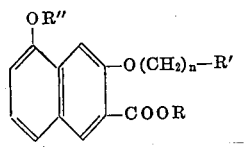

wherein
R is lower alkyl,
R' is di-(lower alkyl) amino or such heterocyclic groups as morpholino, piperidino, thiomorpholino, piperazino, N-methylpiperizino, or pyrrolidino, which heterocyclic groups may be further substituted,
R'' is hydrogen, phenyl-lower alkyl, or substituted phenyl-lower alkyl wherein the substituent may be halogen such as chlorine, bromine, fluorine or iodine, nitro, trifluoromethyl, hydroxy, or lower alkoxy, and
n is an integer from 2–5, and their pharmaceutically acceptable, non-toxic acid addition salts.

The lower alkyl groups, which may be straight chain or branched, contain from one to five carbon atoms and include such groups as methyl, ethyl, propyl, isopropyl, butyl sec-butyl, amyl, isoamyl, and the like. These groups may contain such substituents as hydroxy, amino, or halogen.

Preferably, R is ethyl, R' is dimethylamino, R'' is 4-chlorobenzyl or 3,4-dichlorobenzyl, and n is 2.

The pharmaceutically acceptable, non-toxic acid addition salts include salts of inorganic acids such as hydrochloric, hydrobromic, sulfuric and phosphoric, and of organic acids such as acetic, propionic, glycolic, lactic, malonic, succinic, malic, maleic, fumaric, tartaric, citric, ascorbic, benzoic, hydroxybenzoic, aminosalicyclic, cinnamic, mandelic, benzenesulfonic, toluenesulfonic, nicotinic, isonicotinic, and the like.

According to the process of this invention the compounds were prepared by heating substantially equimolar quantities of a 2-naphthoic acid ester of the formula

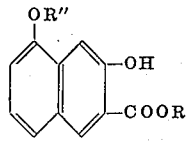

with a chloroalkyl amine of the formula

Cl(CH$_2$)$_n$R' wherein R, R', R'', and n are the same as above, in a solution of ethanol in the presence of an equimolar amount of sodium. After refluxing for a period of about 48 hours, the sodium chloride formed during the reaction was removed by filtration and the free base recovered from the solvent. If desired, the base could be converted into an acid addition salt thereof by dissolving in an inert solvent and adding an equimolecular amount of the acid.

The intermediate 2-naphthoic acid ester of the formula

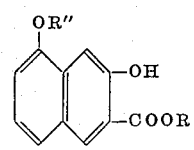

in the case where R'' was not hydrogen, was obtained by refluxing in ethanol substantially equimolar amounts of the desired ester of 3,5-dihydroxy-2-naphthoic acid, a phenyl- or substituted phenyl-lower alkyl chloride, and sodium.

The invention will be more fully illustrated in the examples which follow, which examples are given by way of illustration and are not to be considered as limiting.

EXAMPLE I

Ethyl 5-Benzyloxy-3-hydroxy-2-naphthoate

To a stirred solution of 7.8 g (0.34 g atom) of sodium in 1,000 cc of ethanol, was added 85 g (0.37 mole) of ethyl 3,5-dihydroxy-2-naphthoate. After one-half hr. 47 g. (0.37 mole) of benzyl chloride was added. The reaction mixture was warmed under reflux for 24 hrs. The hot reaction mixture was filtered and the filtrate cooled in an ice bath. A tan solid precipitated out, which was filtered off yielding 15.0 g (m.p. 98°–115° C.) of the crude product. Recrystallization first from ethanol and then from acetonitrile furnished ethyl 5-benzyloxy-3-hydroxy-2-naphthoate, m.p. 112°–114° in 7 percent yield (7.3 g).

EXAMPLE II

Ethyl 5-Benzyloxy-3-(2-piperidinoethoxy)-2-naphthoate Hydrochloride

To a stirred solution of 1.4 g (0.062 g atom) of sodium, in 500 cc ethanol, was added 20 g (0.062 mole) of ethyl 5-benzyloxy-3-hydroxy-2-naphthoate. The reaction mixture was warmed to reflux for one hour. 2-Piperidinoethyl chloride (16.2 g, 0.11 mole) dissolved in 100 cc of benzene was added dropwise to the reaction mixture. The benzene was removed by azeotropic distillation during which time the reaction volume was maintained at 500 cc by the periodic addition of ethanol. Refluxing was continued for 48 hours. The reaction mixture was filtered and the solvent removed from the filtrate. The residue was treated with water and extracted with ether. The ether solution was washed with water and then dried over anhydrous MgSO$_4$. Hydrogen chloride was passed through the ether solution and the precipitated hydrochloride salt crystallized from acetonitrile to yield ethyl 5-benzyloxy-3-(2-piperidinoethoxy)-2-naphthoate hydrochloride, m.p. 163°–6° C. in 38 percent yield (10.8 g).

EXAMPLE III

Ethyl 5-Hydroxy-3-(2-piperidinoethoxy)-2-naphthoate Hydrochloride

A solution of 8.8 g. (0.019 mole) of ethyl 5-benzyloxy-3-(2-piperidinoethoxy)-2-naphthoate hydrochloride in 240 cc. ethanol was treated with 1.0 g. of 10 percent palladium on carbon and hydrogenated at room temperature. The reaction mixture was filtered and the solvent removed in vacuo. The residue, weighing 7.5 g., on recrystallization from acetonitrile furnished 5-hydroxy-3-(2-piperidinoethoxy)-2-naphthoate-hydrochloride, m.p. 153°–6° C. in 61 percent yield (4.4 g.).

In accordance with the procedures described in the above examples, the additional compounds shown in the table below were prepared. In this table the melting points are for the hydrochloride salts.

| R | R' | R'' | n | m.p.°C. |
|---|---|---|---|---|
| Et | Me$_2$N | PhCH$_2$ | 2 | 162–3 |
| Et | Et$_2$N | PhCH$_2$ | 2 | 153–5 |
| Et | pyrrolidino | PhCH$_2$ | 2 | 179–80 |
| Et | i-Pr$_2$N | PhCH$_2$ | 2 | 184–6 |
| Et | Me$_2$N | 4-Cl-PhCH$_2$ | 2 | 150–2 |
| Et | Me$_2$N | 3,4-Cl$_2$PhCH$_2$ | 2 | 172–4 |
| Et | Et$_2$N | 3,4-Cl$_2$PhCH$_2$ | 2 | 155–8 |
| Et | Et$_2$N | 2,4-Cl$_2$PhCH$_2$ | 2 | 198–201 |
| Et | Me$_2$N | 2,4-Cl$_2$PhCH$_2$ | 2 | 213–5 |
| Et | Me$_2$N | PhCH$_2$CH$_2$ | 2 | 149–50 |
| Et | Et$_2$N | PhCH$_2$CH$_2$ | 2 | 127–8 |
| Et | piperidino | PhCH$_2$CH$_2$ | 2 | 174–6 |
| Et | i-Pr$_2$N | PhCH$_2$CH$_2$ | 2 | 149–51 |
| Et | Me$_2$N | PhCH$_2$CH$_2$CH$_2$ | 2 | 133–5 |

| Et | Et₂N | PhCH₂CH₂CH₂ | | 2 | 128–9 |
| Et | piperidino | PhCH₂CH₂CH₂ | | 2 | 140–2 |
| Et | pyrrolidino | PhCH₂CH₂CH₂ | | 2 | 126–30 |
| Et | i-Pr₂N | PhCH₂CH₂CH₂ | | 2 | 155–7 |
| Et | Me₂N | H | | 2 | 165–8 |

Ph=phenyl, Me=methyl, Et=ethyl, i-Pr=isopropyl

The compounds of this invention are potent hypotensive agents which produce decreases in the blood pressure of anesthetized dogs from about 50 to 78 percent and lasting from about 1 to 2 hours when administered intravenously in dosages of from 1 to 5 mg./kg.

The novel compounds of this invention may be combined with solid or liquid pharmaceutical carriers and formulated into tablets, powders or capsules for oral administration, or dissolved in suitable solvents for oral or parenteral administration, for human or veterinary use.

We claim:

1. A compound of the formula

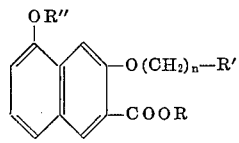

wherein
R is lower alkyl,
R′ is di-(lower alkyl)-amino,
R″ is hydrogen, phenyl-lower alkyl, or halophenyl-lower alkyl, and
n is an integer from 2 to 5 inclusive;
and its pharmaceutically acceptable, non-toxic acid addition salts.

2. A compound according to claim 1, wherein $n$ is 2.
3. A compound according to claim 2, wherein R is ethyl.
4. A compound according to claim 3, wherein R′ is dimethylamino.
5. A compound according to claim 4, wherein R″ is hydrogen.
6. A compound according to claim 4, wherein R″ is phenyl-lower alkyl.
7. A compound according to claim 6, wherein R″ is benzyl.
8. A compound according to claim 5, wherein R″ is 2-phenylethyl.
9. A compound according to claim 6, wherein R″ is 3-phenylpropyl.
10. A compound according to claim 4, wherein R″ is 4-chlorobenzyl.
11. A compound according to claim 4, wherein R″ is 3,4-dichlorobenzl.

* * * * *